United States Patent
Fourie et al.

(10) Patent No.: US 6,356,629 B1
(45) Date of Patent: Mar. 12, 2002

(54) SWITCHED VIRTUAL CIRCUIT CONTROLLER SETUP CONGESTION MANAGEMENT STRATEGY

(75) Inventors: Henry Fourie, Los Gatos; Snehal G. Karia, Freemont, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/241,597

(22) Filed: Feb. 2, 1999

(51) Int. Cl.$^7$ .............................................. H04M 15/00
(52) U.S. Cl. ................ 379/112.1; 379/111; 379/112.01; 379/112.04; 379/112.06; 379/133
(58) Field of Search ................. 379/113, 137, 379/138, 198, 220, 221, 242, 244, 111, 112.01, 112.04, 112.06, 112.1, 133

(56) References Cited

U.S. PATENT DOCUMENTS

| | | | |
|---|---|---|---|
| 4,626,624 A | * 12/1986 | Daisenberger | 379/137 |
| 5,067,074 A | * 11/1991 | Farel et al. | 709/235 |
| 5,295,183 A | * 3/1994 | Langlois et al. | 379/113 |
| 5,313,454 A | 5/1994 | Bustini et al. | |
| 5,359,592 A | 10/1994 | Corbalis et al. | |
| 5,479,604 A | 12/1995 | Lorenz et al. | |
| 5,519,690 A | 5/1996 | Suzuka et al. | |
| 6,018,519 A | * 1/2000 | Ginzboorg | 370/236 |

OTHER PUBLICATIONS

Mito, M. et al; "B–ISDN Signalling Protocol Processing for Large Multiplexed Subscriber System," 1995 IEEE International Conference on Communications. Converging Technologies for Tomorrow's Applications. ICC '96. Proceedings of ICC/SUPERCOMM '96—International Conference on Communications, Dallas, TX, USA, pp. 663–668 vol. 2, XP002140624 1996.

International Search Report mailed Jul. 4, 2000 in counterpart PCT application No. PCT/US00/02604.

* cited by examiner

Primary Examiner—Ahmad Matar
Assistant Examiner—Bing Bui
(74) Attorney, Agent, or Firm—Blakely, Sokoloff, Taylor & Zafman LLP (57) ABSTRACT

A method that specifies a congestion management strategy for a SVC (Switched Virtual Circuit) controller in a connection-oriented network. The rate of setup messages arriving at a given interface handled by the controller and the aggregate number of calls being established are compared against a set of thresholds to determine whether or not to allow new call setup messages from being processed. The congestion strategy regulates the consumption of controller resources such as processor load and memory utilization.

23 Claims, 6 Drawing Sheets

SWITCHED VIRTUAL CIRCUIT CONTROLLER SETUP CONGESTION MANAGEMENT STRATEGY

1. Field of the Invention

The invention relates generally to communications and networking. More specifically, the invention relates to the usage of resources in networking devices.

2. Background of the Invention

In connection-oriented networking schema such as ATM (Asynchronous Transfer Mode), connections or "calls" must be established between one information device such as a computer system or router and another. This call or connection is sometimes referred to as a "virtual circuit" (VC) particularly where a specified data pipe is artificially, through software, segmented into separate data-pathways, each pathway servicing a particular VC. Often a switch acts as an intermediary to direct one or more of these VCs through a particular network node, and thus these calls are collectively referred to as SVCs (Switched Virtual Circuits).

Figure 1:
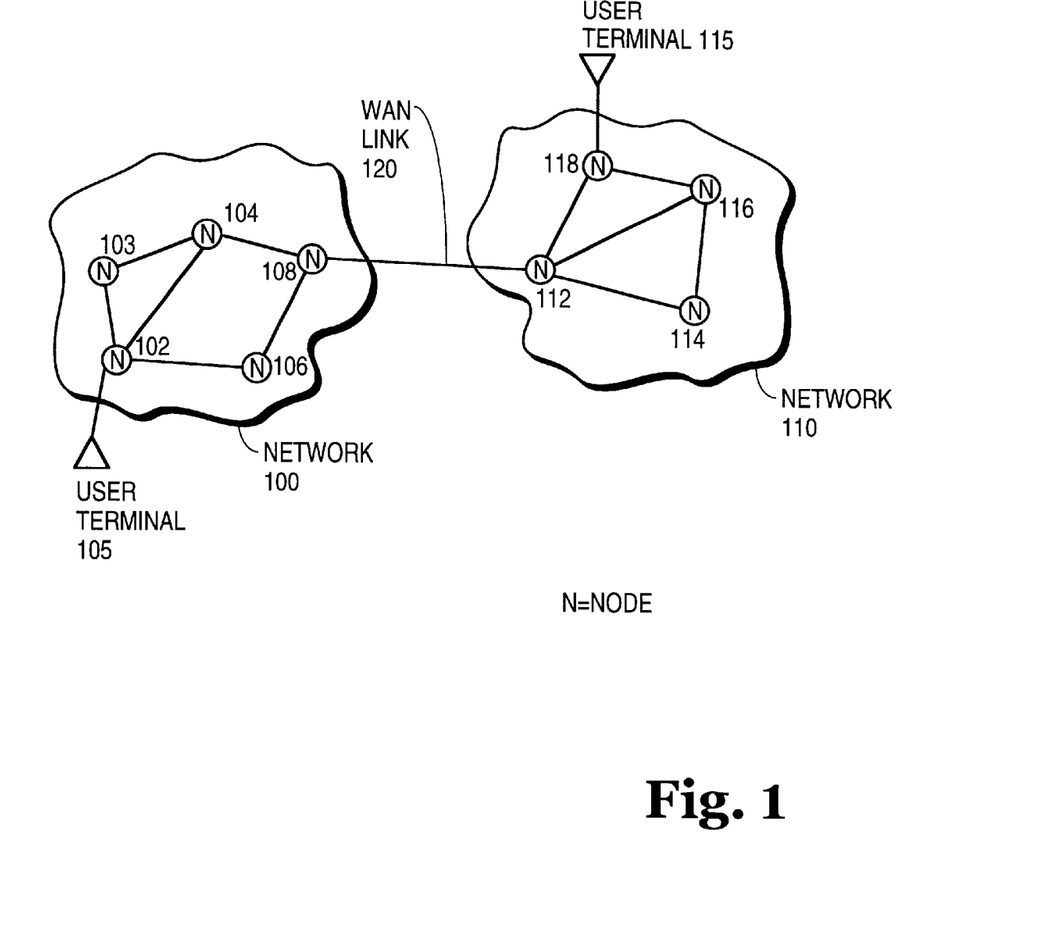
FIG. 1 illustrates an exemplary networking topology.

FIG. 1 shows an exemplary wide-area networking system serviced by ATM. A wide-area network (WAN) link 120 interconnects a first network 100 with a second network 110. Each network has a plurality of nodes which may each contain switching devices that regulate data traffic to one or more user terminals. Network 100 is shown having nodes 102, 103, 104, 106 and 108, while network 110 is shown having nodes 112, 114, 116 and 118. A first user terminal 105 is connected to node 102 of network 100 while a second user terminal 115 is connected to node 118 of network 110. In order for user terminal 105 and user terminal 115 to communicate with one another, a call must first be established between them. This call may be switched through a plurality of nodes. one possible route for sending data from user terminal 105 to user terminal 115 is for data to go from node 102 to 106 to 108 and then across the WAN link to node 112 and node 118 finally reaching user terminal 115.

Similar to PSTN (Public Switched Telephone Network) communications such as telephone calls, the period of SVC call operation for a given call can be split into three distinct phases-establishment (setup), active (data transfer) and disconnect (hang-up). Once a call is established, say between user terminal 105 and user terminal 115 across a specified path, a virtual circuit will have been created and the call can proceed into the active phase where data is transferred. Once the data transfer is complete, the call can be disconnected which will release the virtual circuit.

Each node has a controller device (SVC controller) and switch which facilitates the calls through its node. The SVC controller has processing, memory and other resources to interpret, forward and process messages and initiate other messages as appropriate, while the switch ordinarily handles the physical routing of messages among nodes and user terminals.

Figure 2:
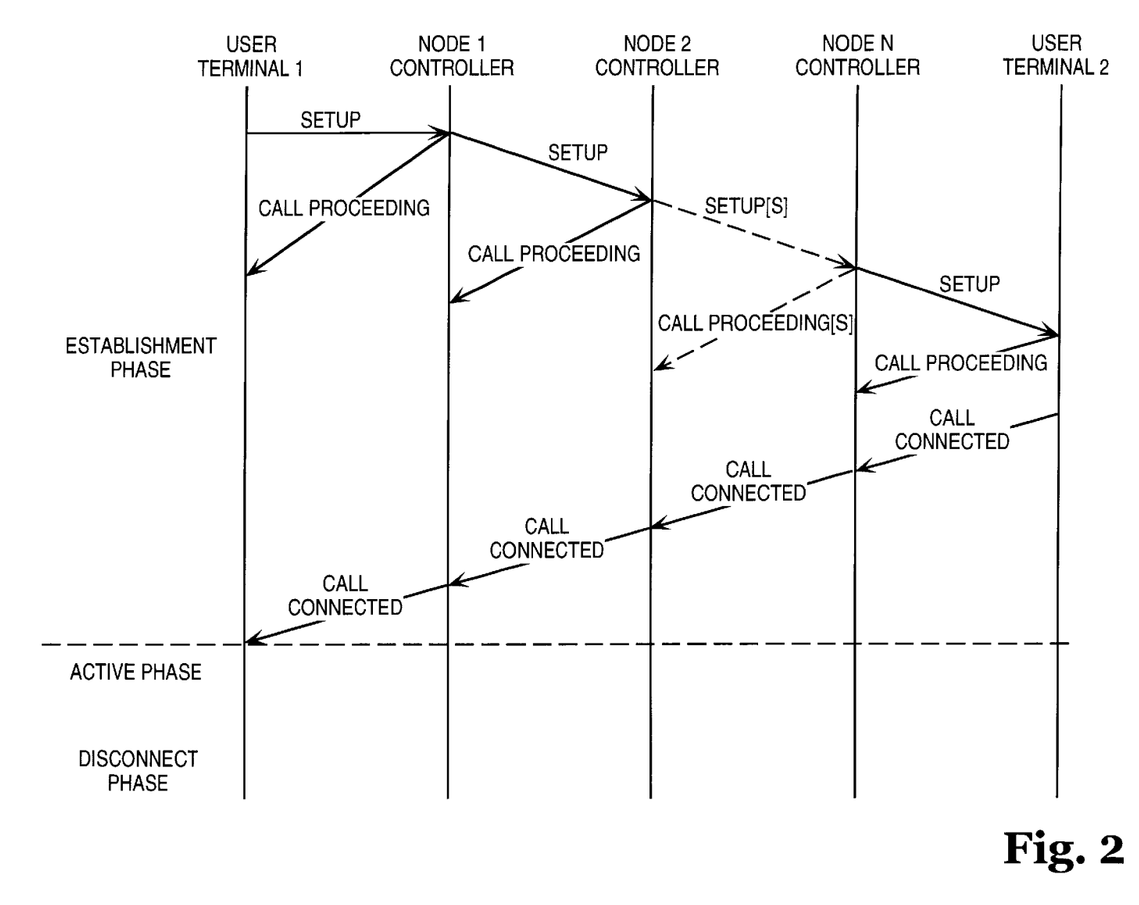
FIG. 2 illustrates the messages and their forwarding in a call establishment.

In a wide-area network, as that shown in FIG. 1, call setup may have to proceed through an arbitrarily large and unknown number of nodes before it can be completed. FIG. 2 shows a call setup session between a first user terminal and a second user terminal that proceeds through a series of N nodes. Each of the nodes 1, 2, . . . , N have a controller device that performs, among other functions, the data link layer (Layer 2) and transport layer (Layer 3) processing and forwarding of messages. Among such messages are call setup messages. For instance, in FIG. 2, when establishing a call between user terminal 1 and user terminal 2, user terminal 1 will first initiate a setup message informing the node 1 controller that a connection wishes to established with user terminal 2. The node 1 controller sends back an acknowledgement message informing user terminal 1 that the call establishment is still in progress (call proceeding). The node 1 controller will then forward the call setup initiator message to next down-the-line node, node 2. Upon receiving the setup message, the node 2 controller responds with a call proceeding message to the node 1 controller. The node 2 controller forwards the call setup message to another node's controller, which responds with a call proceeding message to node 2, and on and on, until reaching the second user terminal 2 which is directly accessible from node N. User terminal 2 sends a call proceeding message back to the node N controller, and after a time, when the call is connected through, the user terminal 2 sends to the node N controller a call connected message which is forwarded back through the nodes numbered one to N until reaching user terminal 1. At this point, the call is considered "established" and the data transfer phase commences.

The above exemplifies the number of messages needed to setup a single call over N nodes. Each node's controller would have to process and forward at least three messages to facilitate call establishment. Assuming each node is capable of supporting/switching multiple user terminals or other devices, many unique point-point calls are possible. A particular node controller may thus have to process many call setup messages. Each SVC controller has finite resources to provide these and other services, namely, message buffers, call records, CPU processing capacity, I/O bandwidth and so on which are often taxed. Thus, a high setup message arrival rate can potentially consume all of a controller's processing and memory resources. This can result in the controller delivering degraded service to all user terminals. A high setup message arrival rate due to one terminal can thus act to degrade the service provided to all other user terminals.

SUMMARY OF THE INVENTION

What is disclosed is a method of managing congestion in a network controller having a plurality of interfaces comprising monitoring the utilization and potential utilization of resources in a due to message traffic received by the network controller, and instituting controls to limit further message traffic where the measurements exceed upper thresholds.

BRIEF DESCRIPTION OF THE DRAWINGS

The objects, features and advantages of the method and apparatus for the present invention will be apparent from the following description, wherein like references indicate similar elements, in which.

DETAILED DESCRIPTION

What is described is a congestion management strategy for a network controller device such as an SVC (Switched Virtual Circuit) controller that interprets and processes messages related to connection-oriented network calls transported over interfaces connected to the controller. The strategy minimizes call setup traffic with the intended advantage of maintaining a certain level of fairness and quality of service to calls already connected when congestion situations arise.

Th strategy involves first determining whether or not the system is congested, primarily, by deriving two metrics, which will be described in more detail below, and comparing these metrics to a set of thresholds. A control is instituted that, upon a determination of congestion disallows future setup messages. The intended advantages of doing so are that calls that are already established are delivered more reliable service and crashes due to resource overload are minimized.

Figure 3:
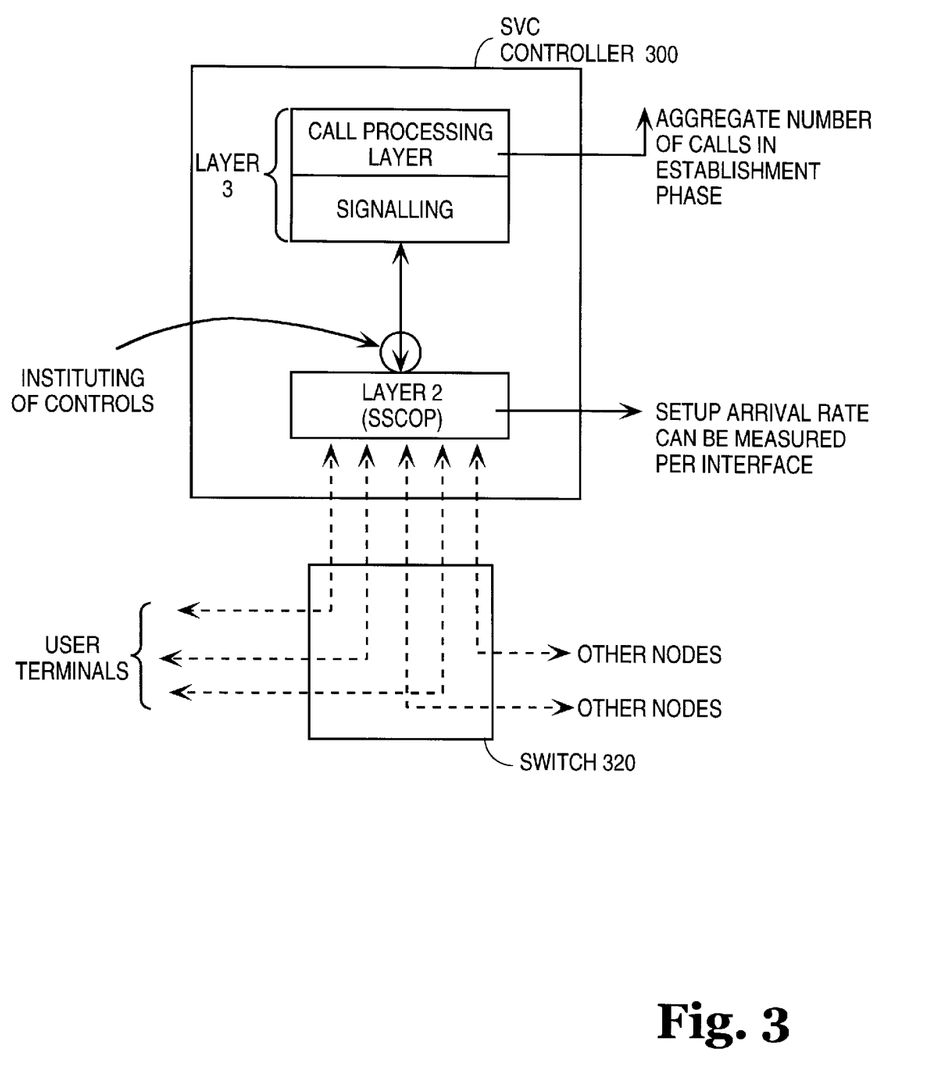
FIG. 3 is a block diagram of call congestion monitoring in a SVC controller.

FIG. 3 is a block diagram of call congestion monitoring in a SVC controller.

Call setup congestion management can be decomposed into two operations: a measurement operation and a control operation. FIG. 3 illustrates a network node that contains a switch device 320 and a SVC controller 300 connected together. The SVC controller has at least two functions, layer 3 and layer 2, which refer to the network and data link layers in the well-known OSI (Open Systems Interconnect) networking model. Switch 320 interconnects the node that it resides in with other nodes in the network, while the SVC controller encodes/decodes and processes all the messages that arrive at the node, and additionally, is responsible for establishing signaling channels with user terminals connected to the switch and the controller itself. Switch 320 also connects user terminals that are connected to the node. Each of the physical connections from the switch to the SVC controller 300, whether to a user terminal or to another node, is referred to hereinafter as an "interface" upon which congestion control is applied. A single interface may host more than "virtual circuit", based upon bandwidth and configuration of the network. When messages of any type are received at the node at a particular interface, they first pass through switch 320 and then are forwarded to the layer 2 function of controller 300. The layer 2 function of controller 300 is also referred to as SSCOP (Service-Specific Connection-Oriented Protocol, set forth in the ITU (International Telecommunication Union) specifications Q.2110 and Q.2130) which provides a reliable data link transport function to layer 3. The layer 3 function performs both signaling and call processing. Not shown is an intermediary buffer between layer 2 and layer 3 which is incorporated for sequencing and timing in some systems.

In the art currently, the SSCOP has a windowing mechanism that can be used to control the flow of signaling messages. This flow control mechanism applies to all signaling messages regardless of content and thus regardless of their potential usage or effect on controller resources. Under the windowing mechanism, once signaling messages become too burdensome, all further signaling messages are blocked. Certain signaling messages, such as disconnect phase messages, however, would be useful to process at layer 3 since they may have a net effect of freeing system resources. To prevent this arbitrary windowing, an enhanced congestion management strategy has been developed that behaves in accordance with the type of message received. The congestion strategy regulates the consumption of controller resources such as processor load and memory utilization but does so interface by interface so that a single user (on that interface) does not act to degrade quality of service provided to all other users, particularly those whose calls are already being established or are already active. By doing so, a level of fairness is delivered to all users.

Messages that free system resources even though initially requiring processing activity by the CPU are the "Release", "Release Complete", "Drop Party", "Drop Party Ack" and "Drop Party Reject" messages. Although the exact nomenclature and number of signaling messages will vary from system to system, these messages, whatever form they may take can be prioritized as follows:

1. Messages that complete release phase activity thus freeing system resources.

2. Messages that use system resources but initiate the call release phase, thus leading to an eventual freeing of resources.

3. Messages that complete call establishment, since call setup initiation is already complete, in fairness, the call should be allowed to be connected through.

4. Messages that initiate call establishment consuming resources without guarantee that a call will be completed i.e., they are risky in comparison to the benefit provided.

Using the above classification, messages of the first type have the highest priority, type 2 are second in priority, type 3 are next and finally messages of the fourth type, the lowest in priority. The lower the priority of the message, the more effective it is to flow-control them.

The two primary metrics for determining when and what controls should be employed even given the above classification are 1) a Setup message arrival rate for each interface (i.e., each physical connection to the switch whether between the node and user terminals under its care or between the node and other network nodes) and 2) the aggregate number of calls in the establishment phase. Two additional metrics are the number of buffers used by Setup messages and processor utilization.

The first of the primary metrics, that of the per-interface Setup message arrival rate, can be measured from the layer 2 function. The layer 2 SSCOP mechanism looks at the message header and reads the message type field. If the message type indicates a Setup message, then an arrival message counter can be incremented. The per-interface setup arrival rate is measured by counting the number of setup messages received on an interface over a given interval. At the beginning of each new interval, the arrival message counter is cleared.

The layer 3 call processing mechanism can be monitored to determined the aggregate number of calls in the establishment phase. The call processing module increments an aggregate call establishment counter when a Setup message is processed therein. The call processing module determines when a call has completed the establishment phase by the receiving the appropriate signaling message and at that point decrements the aggregate call establishment counter. Though the counter mechanisms are not specifically illustrated in FIG. 3, one of ordinary skill in the at could readily incorporate such functionality either in hardware or software or use pre-existing counting mechanisms to implement the methodology discussed herein. These are the basic rules for determining setup congestion. More detailed rules for these metrics are discussed below. Also discussed below is the basic control instituted when the metrics fall above or below various thresholds which the discarding of any Setup messages.

Figure 4:
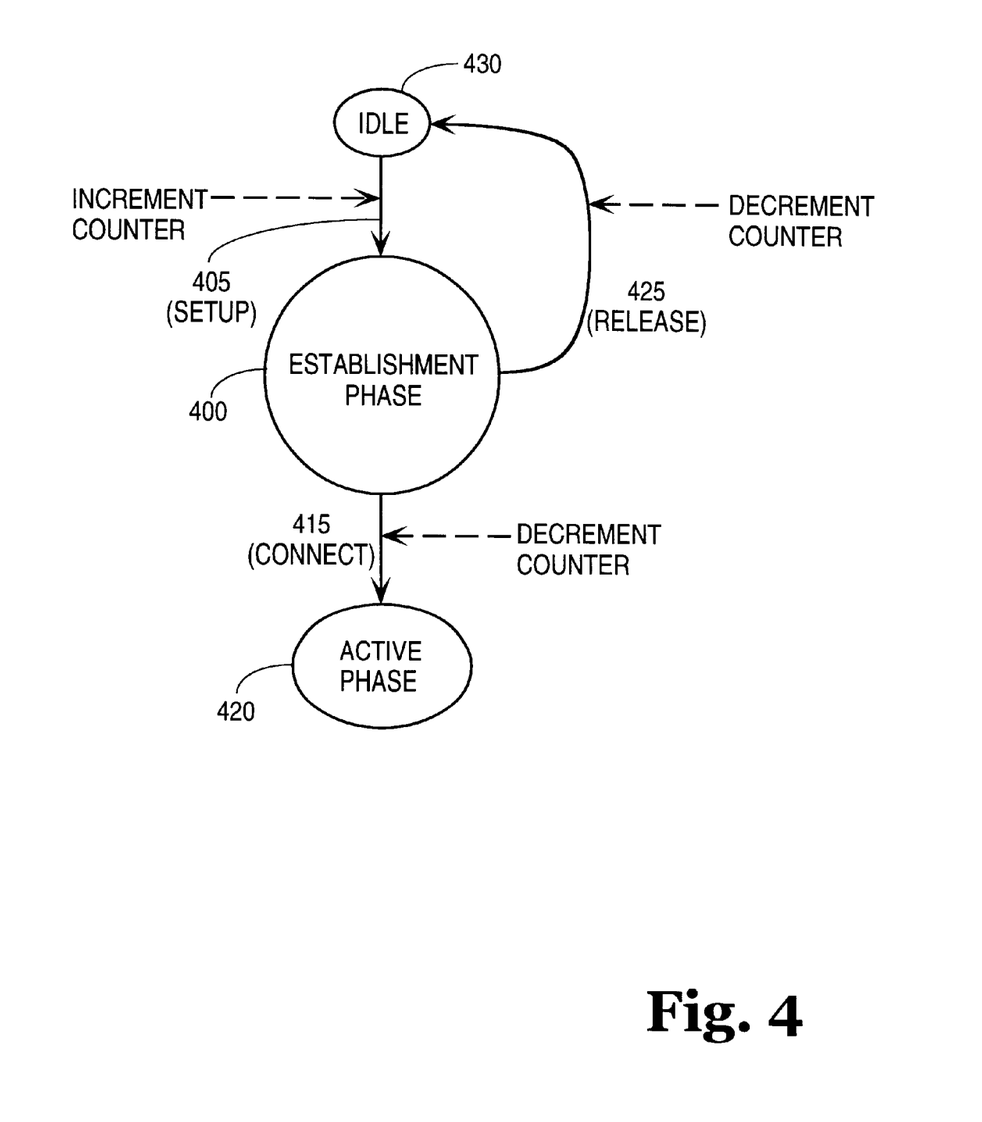
FIG. 4 illustrates a methodology for tracking the aggregate number of calls in the establishment phase.

FIG. 4 illustrates a methodology for tracking the aggregate number of calls in the establishment. Referred to as calls "in progress" these are calls that are being established but have yet to connect and transfer user data. The aggregate number of calls in progress is one of the two major metrics used in instituting call setup congestion control. As shown in FIG. 3, a mechanism for aggregating the number of calls in progress would derive its data from the call processing function of the layer 3 elements within the SVC controller. The call processing function interprets the exact content of the message and initiates particular processor activity within the controller to carry out any actions that the call message dictates. As mentioned above, a feature of an embodiment of the invention is to not only establish controls, but establish them based on what net effect a particular type of message would have on the system. The aggregate number of calls can be tracked using an aggregate calls counter which increments or decrements based upon the content of the message.

For a given potential call, before a call establishment is initiated, the call is an idle state 430. Certain messages, namely those labeled 405, 415 and 425 trigger a transition of state. The establishment phase 400 begins with the receipt of a Call Setup message at a particular node shown as a state transition 405. The aggregate calls counter within a node is incremented, as shown in FIG. 4 when a node receives a Call Setup message 405. When a call is connected, a Connect message 415 is received at the node indicating that the call is in the active phase 420. As such, the call is no longer "in progress," but rather has been fully established. As such, the aggregate calls counter is decremented when a transition from establishment phase 400 to active phase 420 is indicated, usually by a Connect message 415.

A call may also no longer be "in progress" if certain release initiation event message(s) such as Release message 425 are received by the node which may lead to the idle state 430 prior to being fully connected. Thus, whenever Release messages 425 are received during the establishment phase then an aggregate call counter is decremented since a transition back to the idle state 430 is occurring. For example a destination busy signal would end the establishment phase and send a Release message to the originator, thus triggering the idle state.

The messages received which trigger the incrementing or decrementing of the counter do not need to belong to a particular call since only an aggregate number is being measured. The aggregate calls counter should always remain running so that node is aware of the totality of calls in progress. This measure is useful since it specifies the total volume of calls being established at the node. When combined with a per-interface measure, controls can be instituted to discard new Setup messages when the Setup message arrival rate and aggregate number of calls in progress exceeds certain thresholds.

Figure 5:
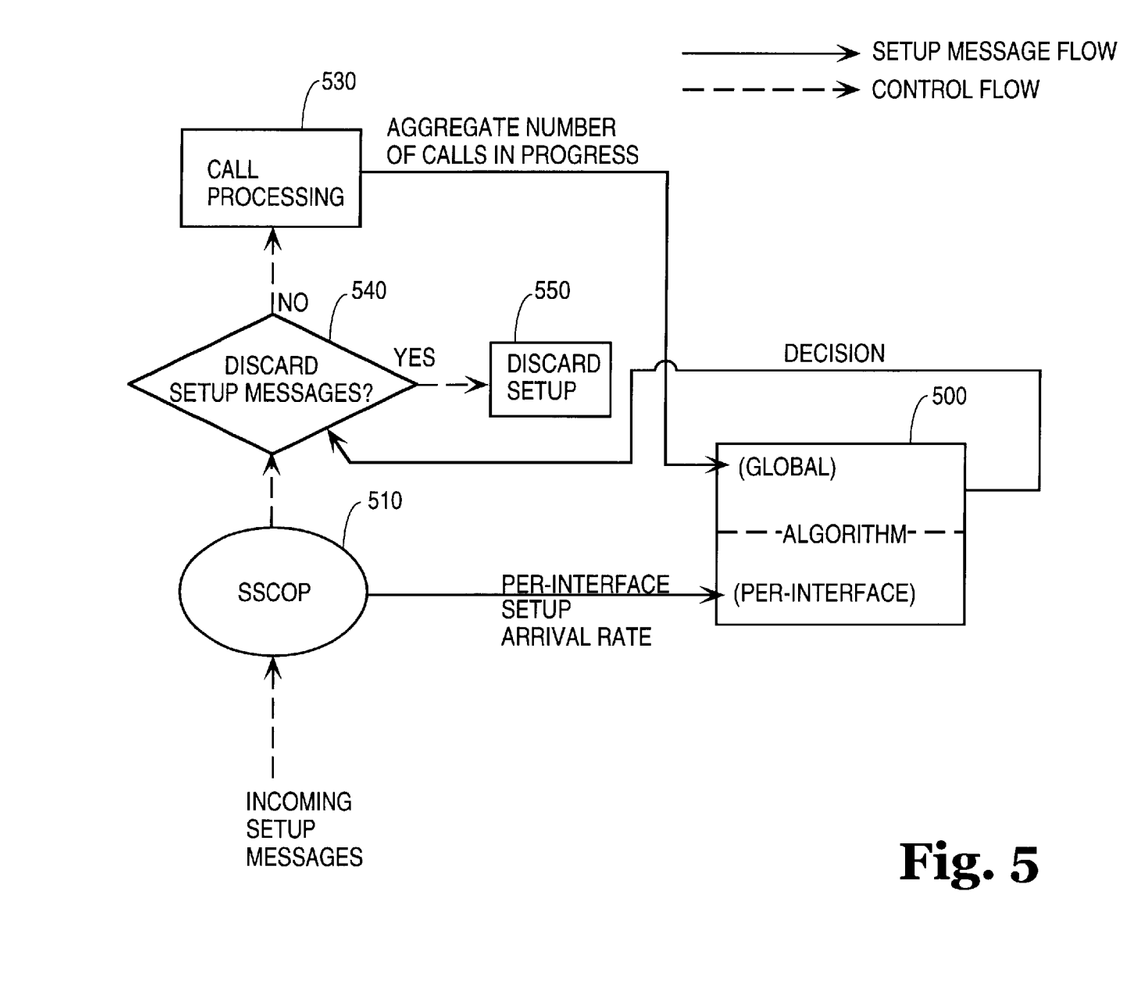
FIG. 5 is a control and message flow diagram of call congestion monitoring and management.

FIG. 5 is a control and message flow diagram of call congestion monitoring and management.

An algorithm 500 for setup traffic congestion management consists of a global and per-interface portions. Algorithm 500 receives at least two input measurements—aggregate number of calls in progress and a per-interface Call Setup message arrival rate. The per-interface setup arrival rate is derived from an SSCOP mechanism 510 while the aggregate number of calls in progress is derived from a call processing mechanism 530. These mechanisms are described above. By comparing these two inputs to a set of thresholds, upper and lower, for each input, certain control decisions may be made, such as when to discard or allow Call Setup messages.

Algorithm 500 makes a per-interface decision as to whether there onset or absence of congestion that requires that Setup messages be discarded and feeds this decision back to block 540. If the decision for a particular interface is that there is congestion, the Setup messages are discarded (block 550) and will not be forwarded to call processing mechanism 530. By discarding messages prior to their being forwarded to the call processing mechanism 530, no processing resources are used by those messages. If the decision is that Setup messages are not be discarded (i.e., allowed), then the Setup messages are forwarded to call processing module 530.

The control action to discard Setup messages should be applied between SSCOP 510 and call processing 530 for two reasons: 1) SSCOP sequencing of messages is not adversely affected and 2) the maximum amount of processor resources are freed (since the control is applied at the earliest possible moment prior to call processing).

Another metric that may be employed in algorithm 500 is a measure of processor utilization which an be compared with thresholds to determine whether or not congestion exists. In nodes that do not have an inter-process buffering mechanism, every effort should be employed to intercept and discard Call Setup messages prior to being forwarded to call processing module 530.

Figure 6:
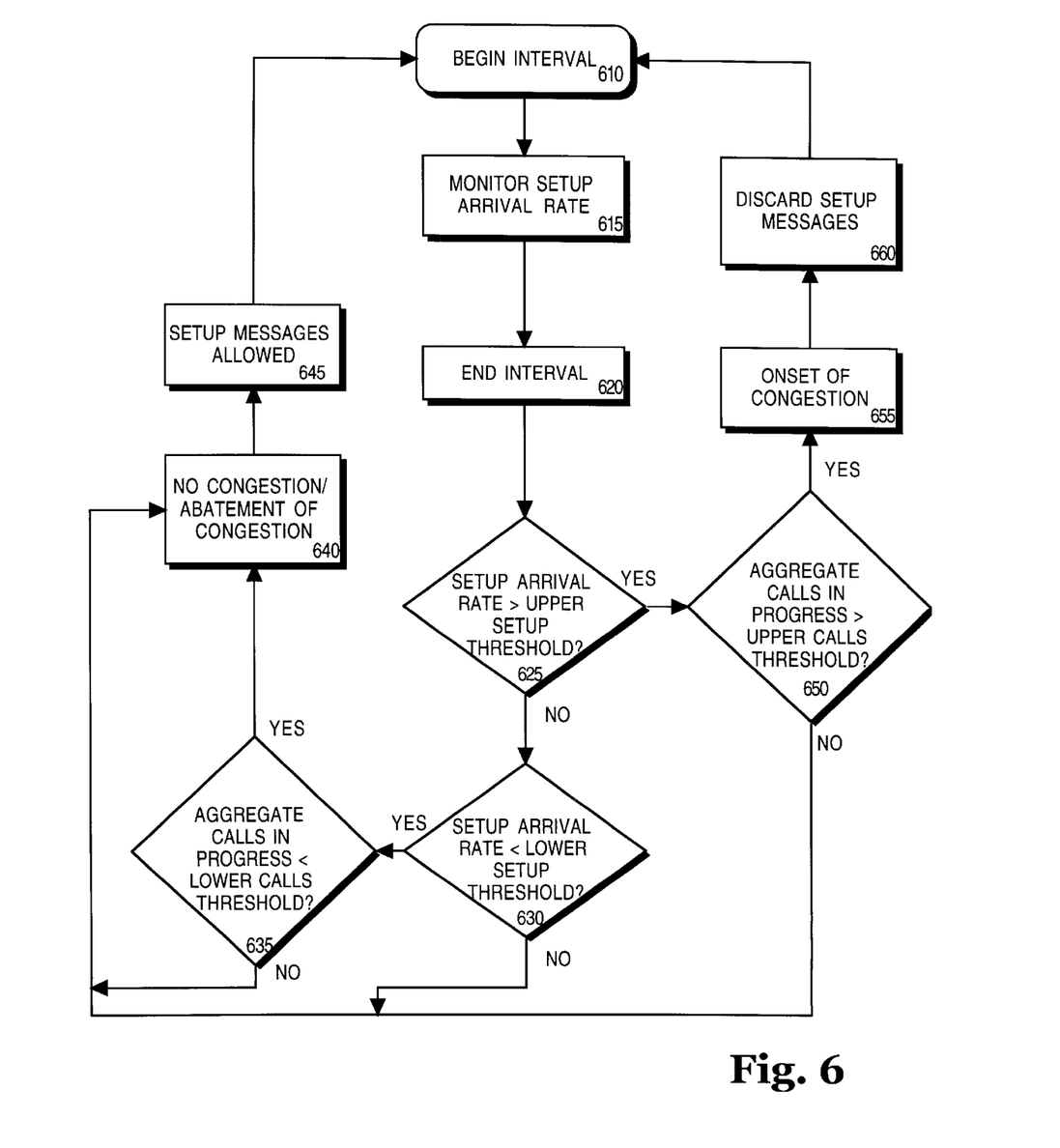
FIG. 6 is a flowchart of call congestion management.

FIG. 6 is a flowchart of call congestion management.

The Call Setup arrival rate can be defined as the number of call setup messages that arrive over a given fixed interval. Accordingly, at the beginning of the interval, a Call Setup counter should be reset to zero (block 610). The setup message arrival rate is then monitored (block 615) during that interval by incrementing the counter whenever a Call Setup message is encountered. The setup arrival rate measurement is concluded at the end of the interval (block 620). At the end of interval (block 620), a control decision is reached based upon the setup arrival rate and the ongoing continuous measure of aggregate calls in progress.

For the setup arrival rate, two thresholds, an upper setup threshold and lower setup threshold, are set by the system and may be predetermined or dynamically modified depending on desired network behavior or quality of service. Likewise, an upper calls in progress threshold and a lower calls in progress threshold is set by the system for the purposes of comparison with the measure of the aggregate number of calls in progress.

To make the control decision, a comparison of the setup arrival rate with an upper setup threshold is performed (block 625). If the setup arrival rate is greater than the upper setup threshold and the aggregate number of calls in progress exceeds the upper calls in progress threshold (compared at block 650), then this indicates the onset of congestion (block 655) that must be remedied. At this point, a control is initiated at the SSCOP or buffer level that discards pending (???) and any setup messages that may arrive during the next interval. After the control is enforced, the counter for setup arrival rate is reset and the next interval begun (block 610). At the end of the next interval, if both the setup arrival rate is lower than the lower setup threshold (block 630) and the aggregate calls in progress falls below the lower calls in progress threshold, then the congestion will be deemed abated (block 640).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of managing congestion in a network controller connected to a plurality of interfaces comprising:

monitoring the utilization and potential utilization of resources due to message traffic received by said network controller;

instituting controls to limit further message traffic where executed measurements exceed upper thresholds;

releasing said controls where said measurements fall below lower thresholds;

monitoring the rate at which setup messages arrive at a given interface supported by said network controller; and monitoring an aggregate number of calls in progress over all interfaces supported by said network controller;

wherein said aggregate number of calls in progress is monitored from a call processing layer implemented in said network controller and setup message arrival rate is monitored from a Service Specific Connection Oriented Protocol (SSCOP) layer implemented in said network controller.

2. A method according to claim 1 wherein monitoring the rate at which setup messages arrive includes:

initializing a setup message arrival counter at the beginning of an interval; and counting the number of setup messages received at said each interface during said interval.

3. A method according to claim 2 wherein counting includes:

incrementing a setup message arrival counter whenever a setup message is received at said each interface during said interval.

4. A method according to claim 1 wherein monitoring the number of aggregate calls in progress includes:

incrementing an aggregate calls-in-progress counter when a transition for a call from the idle state to the establishment phase is indicated; and decrementing said aggregate calls-in-progress counter when a transition for a call from the establishment phase to active phase is indicated.

5. A method according to claim 4 wherein monitoring the number of aggregate calls in progress further includes:

decrementing said aggregate calls-in-progress counter when a transition for a call from the establishment phase to idle phase is indicated.

6. A method according to claim 1 wherein the instituting of controls comprises:

comparing at each interface said setup message arrival rate with an upper setup threshold;

if said setup message arrival rate exceeds said upper setup threshold, then comparing said aggregate number of calls in progress with an upper calls in progress threshold; and if said aggregate calls in progress exceeds said upper calls in progress threshold, then discarding any further setup messages arriving at said each interface before said messages are processed where said setup message arrival rate exceeds said upper setup threshold.

7. A method according to claim 6 wherein the releasing of controls comprises:

if said setup arrival rate does not exceed said upper setup threshold, then comparing said setup arrival rate with a lower setup threshold;

if said setup arrival rate falls below said lower setup threshold, then comparing said aggregate number of calls in progress with an lower calls in progress threshold; and if said aggregate number of calls in progress falls below said lower calls in progress threshold, then allowing any further setup messages arriving at said each interface to be processed by said controller where said setup message arrival rate exceeds said upper setup threshold.

8. A method according to claim 7 wherein the instituting of controls includes:

allowing setup messages to be processed by said controller at each interface in any other instance.

9. A method according to claim 1 wherein said controls are instituted upon setup messages before messages are forwarded from said SSCOP layer to said call processing layer.

10. A method according to claim 1 wherein said interfaces define physical connections between the node in which said controller resides and other nodes connected said node in which said controller resides and define physical connections between the node in which said controller resides and user terminals belonging to said node in which said controller resides.

11. A method according to claim 1 wherein said network controller operates to manage switched virtual circuits.

12. A method according to claim 1 wherein said setup messages are Call Setup type messages for the establishment of a call in a connection-oriented network.

13. An apparatus including a network controller capable of supporting a plurality of interfaces, said apparatus comprising:

a monitoring mechanism adapted to measure the utilization of resources at a given interface and through said network controller;

a control mechanism coupled to said monitoring mechanism, said control mechanism adapted to control the congestion through said network controller based on signaling by said monitoring mechanism;

a service-specific connection-oriented protocol (SSCOP) mechanism coupled to said monitoring mechanism to provide a first signal to said monitoring mechanism, said first signal indicating that a setup message is being received at one of said interfaces; and a call processing mechanism coupled to said SSCOP mechanism to receive messages forwarded by said SSCOP mechanism, said call processing mechanism further coupled to said control mechanism to provide a second signal indicating that a call is being established through said network controller.

14. An apparatus according to claim 13 wherein said control mechanism is adapted to discard setup messages prior to forwarding to said call processing mechanism for a given interface upon the monitoring mechanism indicating the onset of congestion.

15. An apparatus according to claim 14 wherein said control mechanism is adapted to allow setup messages prior to forwarding to said call processing mechanism for a given interface upon the monitoring mechanism indicating the absence of congestion.

16. An apparatus according to claim 15 wherein said absence of congestion is indicated by a count of the number of first signals received in a given interval if that count falls below a lower setup message threshold and if a count of the number of second signals received over all interfaces falls below a lower calls-in-progress threshold.

17. An apparatus according to claim 14 wherein said onset of congestion is indicated by a count of the number of first signals received in a given interval if that count exceeds an upper setup message threshold and if a count of the number of second signals received over all interfaces exceeds an upper calls-in-progress threshold.

18. An article comprising a computer readable medium having instructions which when executed manages congestion in a network controller having a plurality of interfaces, said instructions causing:

monitoring the utilization and potential utilization of resources due to message traffic received by said network controller;

instituting controls to limit further message traffic where executed measurements exceed upper thresholds;

releasing said controls where said measurements fall below lower thresholds;

monitoring the rate at which setup messages arrive at a given interface supported by said network controller; and monitoring aggregate number of calls in progress over all interfaces supported by said network controller;

wherein said aggregate number of calls in progress is monitored from a call processing layer implemented in said network controller and per-interface setup message arrival rate is monitored from a Service Specific Connection Oriented Protocol (SSCOP) layer implemented in said network controller.

19. An apparatus for managing congestion in a network controller having a plurality of interfaces comprising:

means for monitoring the utilization and potential utilization of resources due to message traffic received by said network controller;

means for instituting controls to limit further message traffic where executed measurements exceed upper thresholds;

means for releasing said controls where said measurements fall below lower thresholds;

means for monitoring the rate at which setup messages arrive at a given interface supported by said network controller; and means for monitoring an aggregate number of calls in progress over all interfaces supported by said network controller;

wherein said aggregate number of calls in progress is monitored from a call processing layer implemented in said network controller and per-interface setup message arrival rate is monitored from a Service Specific Connection Oriented Protocol (SSCOP) layer implemented in said network controller.

20. An apparatus according to claim 19 wherein means for monitoring the rate at which setup messages arrive includes:

means for initializing a setup message arrival counter at the beginning of a interval; and means for counting the number of setup messages received at said each interface during said interval.

21. An apparatus according to claim 20 wherein means for counting includes:

means for incrementing a setup message arrival counter whenever a setup message is received at said each interface during said interval.

22. An apparatus according to claim 19 wherein means for monitoring the number of aggregate calls in progress includes:

means for incrementing an aggregate calls-in-progress counter when a transition for a call from the idle state to the establishment phase is indicated; and means for decrementing said aggregate calls-in-progress counter when a transition for a call from the establishment phase to active phase is indicated.

23. An apparatus according to claim 22 wherein means for monitoring the number of aggregate calls in progress further includes:

means for decrementing said aggregate calls-in-progress counter when a transition for a call from the establishment phase to idle phase is indicated.

* * * * *